(12) United States Patent
Hsiao

(10) Patent No.: US 6,961,156 B2
(45) Date of Patent: Nov. 1, 2005

(54) GUIDING MECHANISM FOR AN IMAGE CAPTURING DEVICE

(75) Inventor: Hyman Hsiao, HsinChu (TW)

(73) Assignee: Avision Inc., Hsin-Chu Hsien (TW)

(*) Notice: Subject to any disclaimer, the term of this patent is extended or adjusted under 35 U.S.C. 154(b) by 823 days.

(21) Appl. No.: 09/683,457

(22) Filed: Jan. 3, 2002

(65) Prior Publication Data

US 2002/0089704 A1 Jul. 11, 2002

(30) Foreign Application Priority Data

Jan. 8, 2001 (TW) .................................. 90200305 U

(51) Int. Cl.⁷ .............................................. H04N 1/04
(52) U.S. Cl. ..................... 358/497; 358/474; 358/494; 403/187
(58) Field of Search ............................. 358/497, 494, 358/471, 474, 482, 483, 400, 401, 505, 501, 512–514; 403/187, 188; 384/276, 280, 281, 273, 270; 411/531, 534; 399/211; 250/208.1, 234–236

(56) References Cited

U.S. PATENT DOCUMENTS

| | | | | |
|---|---|---|---|---|
| 5,691,825 A | * | 11/1997 | Fujiwara | .................... 358/497 |
| 5,999,277 A | * | 12/1999 | Tsai | ........................... 358/498 |
| 6,771,399 B1 | * | 8/2004 | Batten | ........................ 358/497 |
| 6,888,651 B2 | * | 5/2005 | Lee | ............................ 358/497 |

* cited by examiner

Primary Examiner—Cheukfan Lee
(74) Attorney, Agent, or Firm—Winston Hsu

(57) ABSTRACT

A guiding mechanism is provided for use in an image capturing device. The image capturing device includes a housing, a scanning module movably installed inside the housing for scanning documents, and a driving module for driving the scanning module. The guiding mechanism includes a guide shaft for supporting the scanning module, and at least a sleeve connected to the scanning module and movably installed on the guide shaft. The sleeve includes an inner side and at least two protrusions protruding over the inner side that are respectively positioned on two opposite sides of a line of gravity of the sleeve. The sleeve contacts the guide shaft along the protrusions. When the driving module drives the scanning module to move along the guide shaft, the scanning module is supported by the guide shaft via the at least two protrusions of the sleeve.

7 Claims, 12 Drawing Sheets

GUIDING MECHANISM FOR AN IMAGE CAPTURING DEVICE

BACKGROUND OF INVENTION

1. Field of the Invention

The present invention relates to a guiding mechanism. More specifically, the present invention discloses a guiding mechanism for use in an image capturing device, such as a scanner.

2. Description of the Prior Art

Please refer to FIG. 1 and FIG. 2. FIG. 1 is a diagram of a guiding mechanism 20 for use in an image capturing device 10 according to the prior art. FIG. 2 is an exploded diagram of the guiding mechanism 20 depicted in FIG. 1. As shown in FIG. 1, the image capturing device 10 comprises a housing 11, a scanning module 14 installed inside the housing 11 for scanning documents, and a driving module 17 for driving the scanning module 14. As shown in FIG. 2, the guiding mechanism 20 comprises a guide shaft 22 and two sleeves 24, each sleeve 24 is installed within two corresponding guide rings 16 of the scanning module 14. When the two sleeves 24 are disposed within the two guide rings 16, the guide shaft 22 passes through the two sleeves 24 to serve as a support for one side of the scanning module 14. Additionally, the image capturing device 10 further comprises a linear frame mechanism 18 for supporting the other side of the scanning module 14, which is smoothly disposed against the linear frame mechanism 18. When the driving module 17 drives the scanning module 14, the scanning module 14 moves along the shaft 22, and is supported by the guide shaft 22 and the linear frame mechanism 18.

Please refer to FIG. 3 and FIG. 4. FIG. 3 is a cross-sectional view of the guiding mechanism 20 depicted in FIG. 1 along a line 3—3. FIG. 4 is a force diagram of the scanning module 14 depicted in FIG. 1 when the scanning module 14 is acted upon by an external force. As shown in FIG. 3, a direction along an X-axis (as indicated by the arrow labeled with an "X") is the direction of gravitational force. Dotted line 26 illustrates a line of gravity along the X-axis that is the center of gravity for the sleeve 24. When the guide shaft 22 passes through the sleeve 24, a gap 28 must be maintained between the guide shaft 22 and the sleeve 24 to permit the scanning module 14 to move along the guide shaft 22, and the spacing of the gap 28 must be kept fairly limited. If the spacing of the gap 28 is too narrow, the driving module 17 must provide a larger driving force to overcome friction between the guide shaft 22 and the sleeve 24. If the spacing of the gap 28 is too great, vibration will occur when the scanning module 14 scans a document. The inner surface 25 of the sleeve 24 is a smoothly curved surface, and so if the spacing of the gap 28 is too wide, the guide shaft 22 and the sleeve 24 will meet at what is effectively a single contact point 29. With gravity pulling the sleeve 24 against the guide shaft 22, the scanning module 14 is easily wobbled by a horizontal force. This is shown in FIG. 4. When the scanning module 14 is under a static condition of the gravitational force mg countered by the supporting force F, the scanning module 14 will suffer wobbling in the horizontal direction if the scanning module 14 experiences an unexpected horizontal force F". The sleeve 24 must be tightly disposed within the inner surface of the guide ring 16 to prevent the sleeve 24 from slipping out of the guide ring 16. A manufacturer typically designs the external diameter of the sleeve 24 to be larger than the internal diameter of the guide ring 16. A large force must be used to install the sleeve 24 inside the guide ring 16, which is inconvenient for the manufacture when fabricating the sleeve 24, especially, if interference portions when manufacturing the sleeve 24 and the guide ring are generated too much, damage to the sleeve 24 or the guide ring 16 may occur.

SUMMARY OF THE INVENTION

It is therefore a primary objective of the present invention to provide a guiding mechanism for an image capturing device that prevents a scanning module of the image capturing device from suffering horizontal wobble, and which permits convenient fabrication of the sleeves.

The present invention discloses a guiding mechanism for use in an image capturing device. The image capturing device comprises a housing, a scanning module movably installed inside the housing for scanning documents, and a driving module for driving the scanning module. The guiding mechanism comprises a guide shaft for supporting the scanning module, and at least a sleeve connected to the scanning module and movably installed on the guide shaft. The sleeve has an inner side and at least two protrusions protruding from the inner side that are respectively positioned on two opposite sides of a gravity line of the sleeve. The sleeve contacts the guide shaft along the protrusions. When the driving module drives the scanning module to move along the guide shaft, the scanning module is supported by the guide shaft via the at least two protrusions of the sleeve.

It is an advantage of the present invention that the guiding mechanism has a guide shaft and a sleeve having at least two protrusions positioned on the inner surface of the sleeve, for when the scanning module of the image capturing device is subjected to an external force, the at least two protrusions prevent the scanning module from suffering horizontal wobble.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
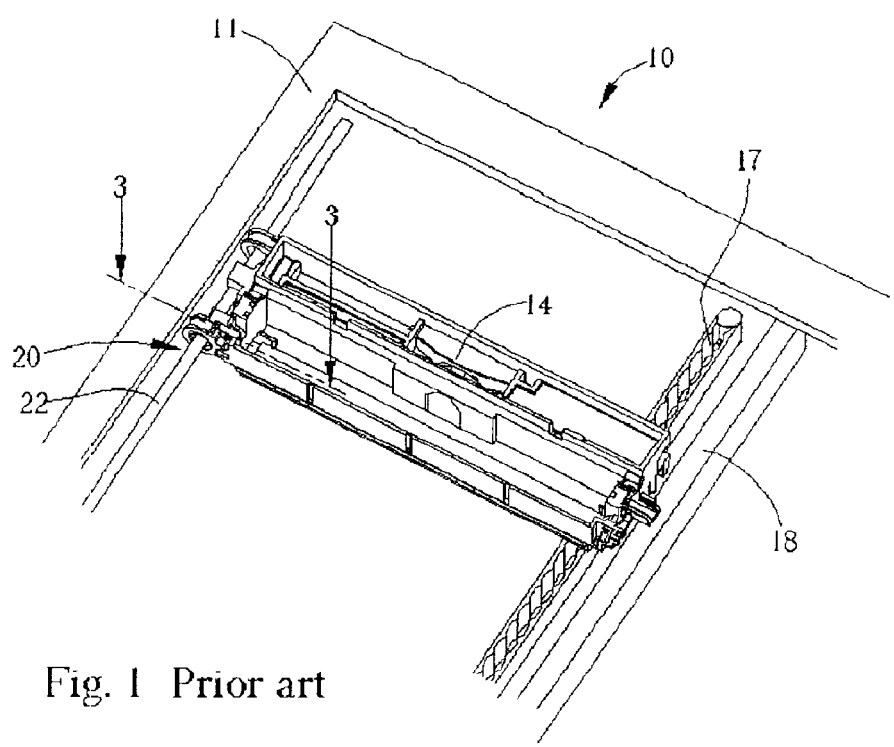
FIG. 1 is a diagram of a guiding mechanism for use in an image capturing device according to the prior art.
Figure 2:
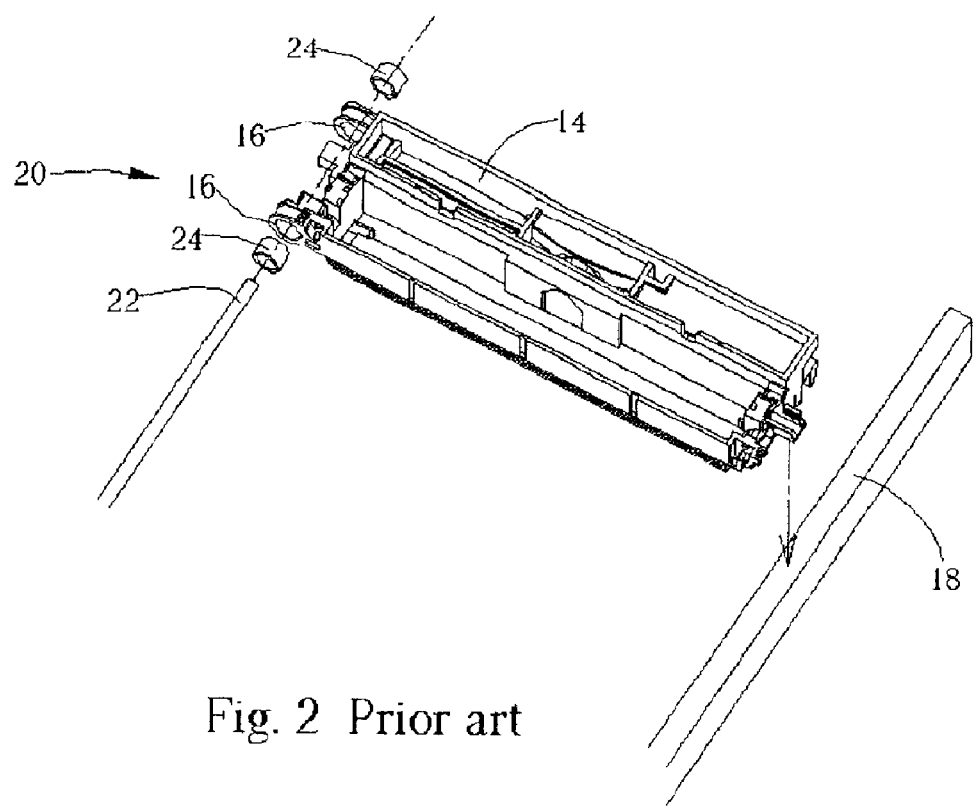
FIG. 2 is an exploded diagram of the guiding mechanism depicted in FIG. 1.
Figure 3:
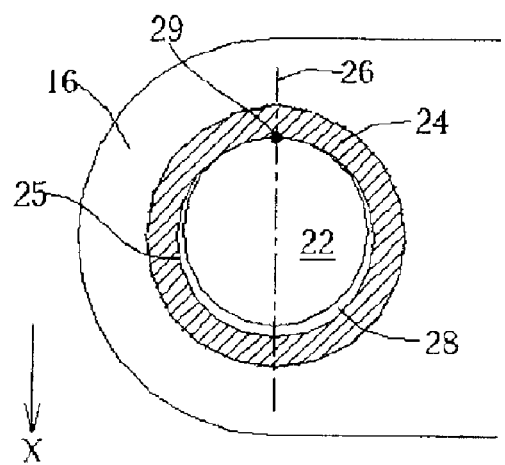
FIG. 3 is a cross-sectional view of the guiding mechanism depicted in FIG. 1.
Figure 4:
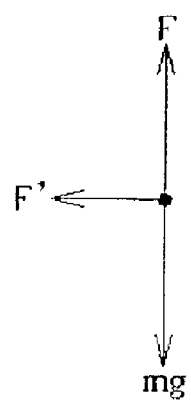
FIG. 4 is a force diagram of the scanning module depicted in FIG. 1 when the scanning module is acted on by an external force.
Figure 5:
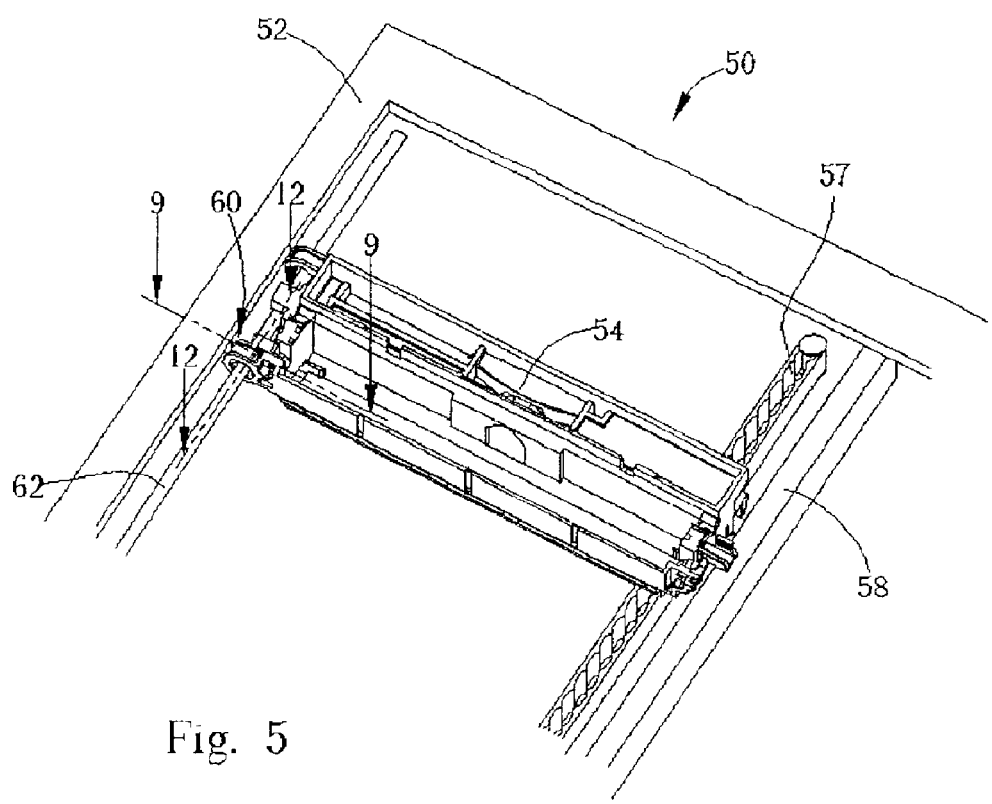
FIG. 5 is a diagram of a guiding mechanism for use in an image capturing device according to the present invention.
Figure 6:
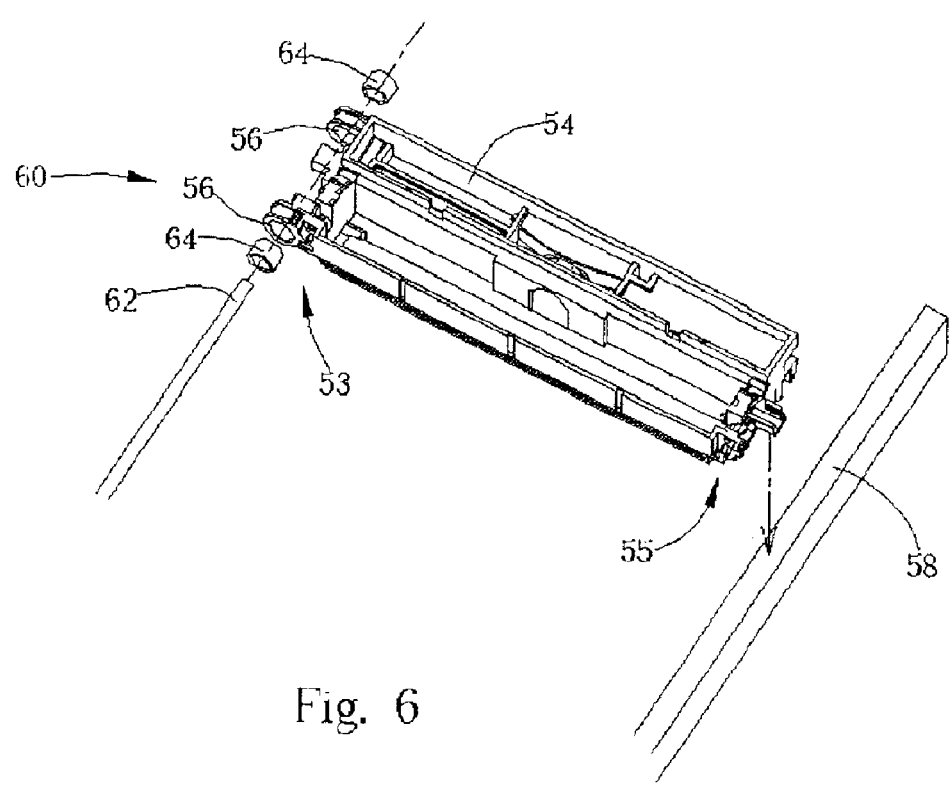
FIG. 6 is an exploded diagram of the guiding mechanism depicted in FIG. 5.

Please refer to FIG. 5 and FIG. 6. FIG. 5 is a diagram of a guiding mechanism 60 for use in an image capturing device 50 according to the present invention. FIG. 6 is an exploded diagram of the guiding mechanism 60 depicted in FIG. 5. As shown in FIG. 5, the image capturing device 50 comprises a housing 52, a scanning module 54 movably installed inside the housing for scanning documents, and a driving module 57 for driving the scanning module 54. As shown in FIG. 6, the guiding mechanism 60 comprises a circular guide shaft 62 and two sleeves 64. The scanning module 54 comprises two guide rings 56. Each sleeve 64 of the guiding mechanism 60 is installed inside the corresponding guide ring 56 of the scanning module 54, and movably installed on the guide shaft 62. With the two sleeves 64 disposed within the two guide rings 56, the guide shaft 62 passes through the two sleeves 64 to support one side 53 of the scanning module 54. Additionally, the image capturing device 50 further comprises a linear frame mechanism 58 that is used to support the other side 55 of the scanning module 54. This other side 55 of the scanning module 54 is smoothly disposed in the linear frame mechanism 58. When the driving module 57 drives the scanning module 54, the scanning module 54 moves along the shaft 62, and is supported by the guide shaft 62 and the linear frame mechanism 58.

Figure 7:
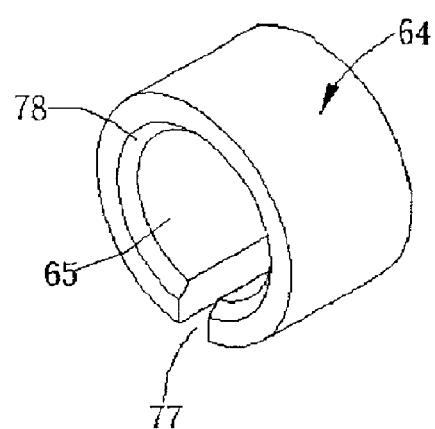
FIG. 7 is a perspective view of a sleeve of the guiding mechanism depicted in FIG. 5.
Figure 8:
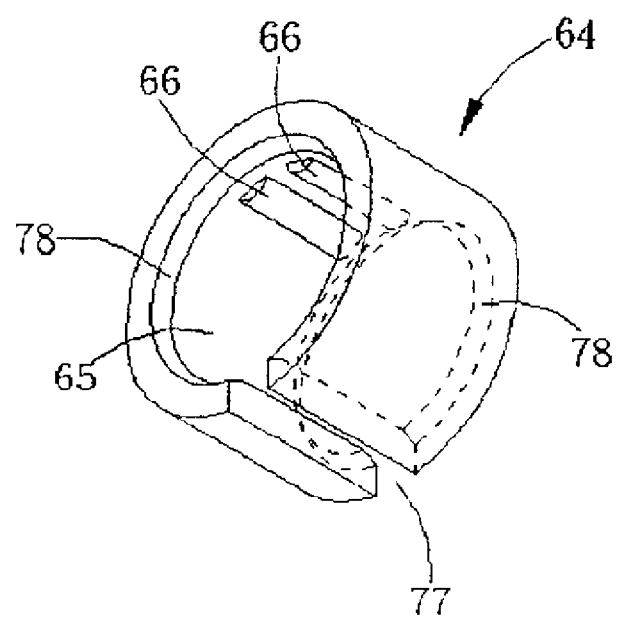
FIG. 8 is another perspective view of the sleeve of the guiding mechanism depicted in FIG. 5.
Figure 9:
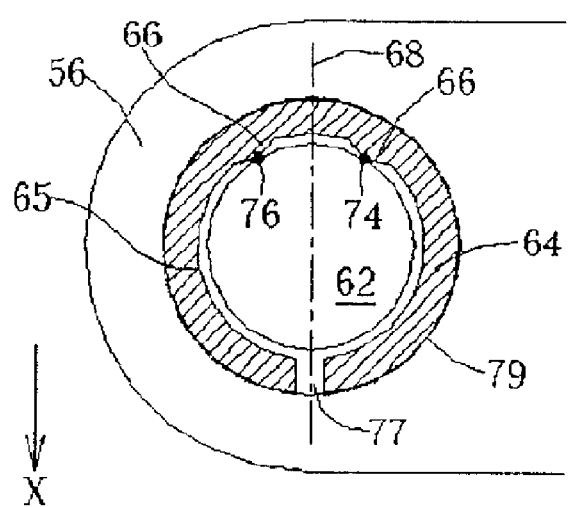
FIG. 9 is a cross-sectional view of the guiding mechanism depicted in FIG. 5.

Please refer FIG. 7 to FIG. 9. FIG. 7 is a perspective view of the sleeve 64 of the guiding mechanism 60 depicted in FIG. 5. FIG. 8 is another perspective view of the sleeve 64 of the guiding mechanism 60 depicted in FIG. 5. FIG. 9 is a cross-sectional view of the guiding mechanism 60 along a tangent line 9—9 of FIG. 5. As shown in FIG. 9, a direction along an X-axis (indicated by the arrow labeled with an "X") is the direction of gravitational force. A dotted line 66 is used to display a line of gravity 68 paralleling the X-axis that is the center of gravity of the sleeve 64. The sleeve 64 is a circular sleeve comprising an inner side 65 and at least two protrusions 66 protruding out over the inner side 65, which are respectively positioned on two opposite sides of the line of gravity 68 of the sleeve 64. When the driving module 57 drives the scanning module 54 to move along the guide shaft 62, the scanning module 54 is supported by the guide shaft 62 via the at least two protrusions 66 of the sleeve 64.

Figure 10:
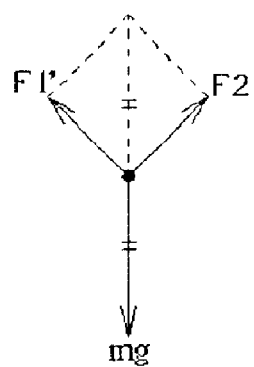
FIG. 10 is a force diagram of the scanning module depicted in FIG. 5 when the scanning module is acted on by an external force.
Figure 11:
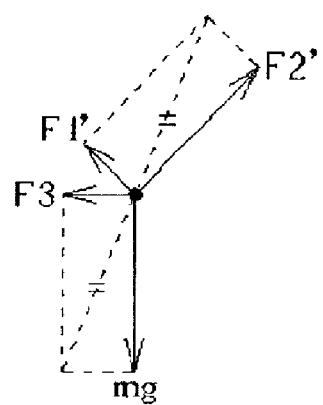
FIG. 11 is a force diagram of the scanning module depicted in FIG. 5 when the scanning module is acted on by a horizontal force.

Please refer to FIG. 10 and FIG. 11. FIG. 10 is a force diagram of the scanning module 54 depicted in FIG. 5 when the scanning module 54 is acted on by an external force. FIG. 11 is a force diagram of the scanning module 54 depicted in FIG. 5 when the scanning module 54 is acted on by a horizontal force F3. As shown in FIG. 10, when the scanning module 54 is supported by the guide shaft 62, the scanning module 54 experiences a downward gravitational force mg, and two supporting forces F1 and F2 exerted by the two protrusions 66 in reaction to the gravitational force. As shown in FIG. 9, when the scanning module 54 is supported by the guide shaft 62 via the at least two protrusions 66 of the sleeve 64, two contact points 74 and 76 exist between the guide shaft 62 and the sleeve 64. When the gravitational force mg exerted by the scanning module 54 causes the sleeve 64 to press against the guide shaft 62, the guide shaft 62 will respectively exert the two supporting forces F1 and F2 onto the scanning module 54 through the contact points 74 and 76. The scanning module 54 is thus in a static state between the three balanced forces mg, F1 and F2. As shown in FIG. 11, when the scanning module 54 experiences a horizontal force F3, the two supporting forces F1 and F2 exerted from the guide shaft 62 onto the scanning module 54 via the two contacting points 74 and 76 will, by reaction, change to balance the horizontal force F3 on the scanning module 54. The scanning module 54 is thus prevented from horizontal wobbling induced by external forces.

The present invention is not limited to only two protrusions 66. More than two protrusions 66 are possible, as well as other shapes for the sleeve 64, while still being in accordance with spirit of the present invention.

The sleeve 64 is an elastomer having a gap 77. When the sleeve 64 is installed within its respective guide ring 56, the sleeve 64 expands elastically outwards to engage an inner surface 79 of the guide ring 56. Greater tolerance for the internal diameter of the guide ring 56 is thus possible for the guide ring 56. The gap 77 can be squeezed to a narrower width owing to the elasticity of the sleeve 64 for situations in which the guide ring 56 is slightly too small, and can expand so that the sleeve 64 continues to fit snugly within a guide ring 56 that is slightly too large.

Figure 12:
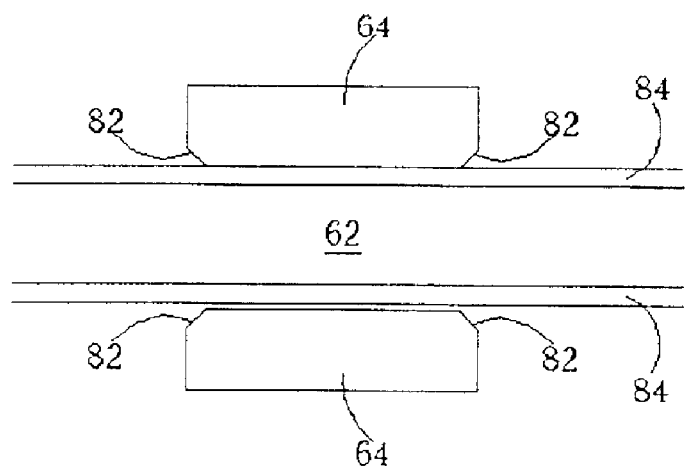
FIG. 12 is a another cross-sectional view of the guiding mechanism depicted in FIG. 5.

Please refer to FIG. 12. FIG. 12 is a cross-sectional view of the guiding mechanism 60 depicted in FIG. 5 along a tangent line 12—12. As shown from FIG. 8 to FIG. 12, a lubricant 84 is disposed over a surface of the guide shaft 62 to reduce friction between the sleeve 64 and the guide shaft 62 so that the driving module 57 can easily drive the scanning module 54. The sleeve 64 has two beveled surfaces 82 respectively enclosed in two sides 78 of the inner side 65 of the sleeve 64 to prevent the lubricant 84 from flowing away from the surface of the guide shaft 62 due to the relative motion between the sleeve 64 and the guide shaft 62.

In contrast to the prior art, the present invention guiding mechanism has a guide shaft and a sleeve having at least two protrusions positioned on the inner surface of the sleeve. When the scanning module of the image capturing device experiences an external force, the at least two protrusions prevent horizontal wobbling of the scanning module. Additionally, when the sleeve is installed within the guide ring of the scanning module, the sleeve elastically expands outwards to engage the inner surface of the guide ring. The sleeve is thus not too tight or too loose due to inaccuracies in the tolerance of the internal diameter of the guide ring.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A guiding mechanism for use in an image capturing device, the image capturing device comprising a housing, a scanning module movably installed inside the housing for scanning documents, and a driving module for driving the scanning module, the guiding mechanism comprising:

a guide shaft for supporting the scanning module; and
   at least a sleeve connected to the scanning module and movably installed on the guide shaft, the sleeve comprising an inner side and at least two protrusions protruding over the inner side that are respectively positioned on two opposite sides of a line of gravity of the sleeve, the sleeve contacting the guide shaft along the protrusions;

wherein when the driving module drives the scanning module to move along the guide shaft, the scanning module is supported by the guide shaft via the at least two protrusions of the sleeve.

2. The guiding mechanism of claim 1 comprising two sleeves, an inner side of each sleeve comprising two protrusions respectively positioned on two opposite sides of the line of gravity of the sleeve to prevent horizontal wobbling of the scanning module, each of the sleeves movably enclosing an outer surface of the guide shaft and contacting the guide shaft via the two protrusions.

3. The guiding mechanism of claim 1 wherein gravitational force exerted by the scanning module causes the sleeve to be depressed against the guide shaft.

4. The guiding mechanism of claim 1 wherein the sleeve is an elastomer having a gap, the scanning module having a guide ring for accepting the sleeve, and when the sleeve is installed within the guide ring, the sleeve is capable of elastically expanding outward to engage an inner surface of the guide ring.

5. The guiding mechanism of claim 1 wherein the image capturing device further comprises a linear frame mechanism for supporting one side of the scanning module, and the guide shaft is used to support the other side of the scanning module.

6. The guiding mechanism of claim 1 wherein the guide shaft is a circular shaft, and the sleeve is a circular sleeve.

7. The guiding mechanism of claim 1 wherein a lubricant is disposed over a surface of the guide shaft to reduce friction between the sleeve and the guide shaft, and the sleeve has two beveled surfaces respectively enclosed in two sides of the inner side of the sleeve to prevent the lubricant from flowing away from the surface of the guide shaft due to relative motion between the sleeve and the guide shaft.

* * * * *